United States Patent
Baszucki

(10) Patent No.: US 9,028,330 B2
(45) Date of Patent: May 12, 2015

(54) GAMING SYSTEM

(75) Inventor: David Baszucki, Portola Valley, CA (US)

(73) Assignee: Roblox Corporation, San Mateo, CA (US)

(*) Notice: Subject to any disclaimer, the term of this patent is extended or adjusted under 35 U.S.C. 154(b) by 499 days.

(21) Appl. No.: 13/040,713

(22) Filed: Mar. 4, 2011

(65) Prior Publication Data

US 2012/0225720 A1 Sep. 6, 2012

(51) Int. Cl.
*A63F 13/12* (2006.01)
*H04L 29/08* (2006.01)
*H04L 29/06* (2006.01)

(52) U.S. Cl.
CPC ......... *H04L 67/02* (2013.01); *A63F 2300/5546* (2013.01); *H04L 67/38* (2013.01)

(58) Field of Classification Search
USPC .................. 463/1, 30–33, 140–42, 40–42
See application file for complete search history.

(56) References Cited

U.S. PATENT DOCUMENTS

| | | | |
|---|---|---|---|
| 8,226,485 B1* | 7/2012 | Mooney et al. | 463/42 |
| 8,388,446 B1* | 3/2013 | Craine et al. | 463/42 |
| 2008/0004117 A1* | 1/2008 | Stamper et al. | 463/42 |
| 2009/0239666 A1* | 9/2009 | Hall et al. | 463/42 |
| 2011/0212762 A1* | 9/2011 | Ocko et al. | 463/25 |
| 2012/0015739 A1* | 1/2012 | Craine et al. | 463/42 |
| 2012/0015740 A1* | 1/2012 | Vanbragt et al. | 463/42 |
| 2012/0122587 A1* | 5/2012 | Kelly et al. | 463/42 |

* cited by examiner

*Primary Examiner* — Ronald Laneau
*Assistant Examiner* — Ross Williams
(74) *Attorney, Agent, or Firm* — Donald R. Boys; Central Coast Patent Agency, Inc.

(57) ABSTRACT

A network-based gaming system includes a website hosted by a web server connected to the network, the website including a member login interface, a social graph application program interface (API), and at least one hyperlink to a multi-dimensional game served by a game server connected to the network and a social graph information reader accessible to the game server, the social graph information reader for identifying one or more players of the game by correlating identification information provided or known about the players with social graph data aggregated about the players, and a game configuration interface resident on and executable from the digital medium accessible to the game server, the game configuration interface enabling a member to configure rules pertaining to game and or game object recognition of, and treatment of certain players of the game determined to be friends of the member.

8 Claims, 5 Drawing Sheets

GAMING SYSTEM

BACKGROUND OF THE INVENTION

1. Field of the Invention

The present invention is in the field of digital social networking including social graph representation of social networks and pertains particularly to methods and apparatus for discovering and engaging one or more social graph nodes through Internet gaming activities.

2. Discussion of the State of the Art

Digital social networking has evolved to include an abstract concept of social graph representation. A social graph is a representation of a social network at any current point in time via identification of connection types and relationship attributes, also referred to as edge attributes, between network nodes which are usually people that belong to one or more social networks or services like Myspace™, Facebook™, Twitter™, Linkedin™, and others.

Leading businesses in social networking like Facebook™ have made social graph information easy to access by providing application program interface (API) functionality that other social interaction sites may install to enable access to public social graph information about social graph nodes through open source markup languages like XHTML Friends Network (XFN), Friends Of A Friend (FOAF) and Google's Open Social API. The goal of such functionality as described above is primarily to make joining a new network and adding users to the network much easier and more streamlined, and building more friend-aware applications.

By querying the API using a universal resource locator (URL) lookup format, the API performs a lookup in a central repository provided for the purpose and returns social graph node information in accordance with the desired level or depth of the query. A service then may, through the API, suggest to the new user the contacts that exist that the user might wish to ad to the new network.

Another type of social interaction is online gaming where users typically login to a game server and play a selected game or engage a "virtual environment" with other users that may or may not be connected to them as friends, contacts, family, or some other defined relationship or connection type. It has occurred to the inventors that membership to gaming sites might be greatly increased through leveraging social graph information associated to current users of the gaming site discovered from querying a social graph API installed on the gaming site on within the game itself.

Therefore, what is clearly needed is a system and methods for leveraging social graph information associated with a user to provide pre-game social object intelligence (GOI) for identifying and treating other potential gamers or users that have some level of connection to that user in one or more other social networks.

SUMMARY OF THE INVENTION

The problem stated above is that driving more traffic to Internet business Websites is desirable for network-based business, but many of the conventional means for creating driving more traffic to a Website, such as advertising, cross linking to other sites, and newer social graph data services also create less than satisfactory growth rates in such as site membership, for example. The inventors therefore considered functional elements of a Website with the ability to aggregate social graph data, looking for elements that exhibit interoperability that could potentially be harnessed to provide website growth in an important category such as in site membership but in a manner that would be more proactive and less passive.

Every web-based business is propelled by consumer presence at the site, one by-product of which is repeated involvement with and engagement to the business and its products. Most such web-based businesses employ advertising, cross linking, and data aggregation of customer data, to improve business and to attempt to grow consumer base and server, monitoring, and enterprise software applications are typically a part of such apparatus.

The present inventor realized in an inventive moment that if, during engagement, friends including contacts and associates of site members discovered through social graph mapping could be positively engaged through incentive-based activities and unique treatments when in session, significant loyalty of that potential customer might result, leading to new growth in member base for the site. The inventor therefore constructed a unique gaming system that allowed members to discover all of their friends through a social graph application program interface (API) and to engage those friends through incentive-based activities and special pre-configured treatments during session. A significant loyal membership base results with no impediment to growth or consumer experience created.

Accordingly, in one embodiment of the present invention, a network-based gaming system is provided and includes a website resident on and executable from a digital medium accessible to a web server connected to the network, the website including a member login interface, a social graph application program interface (API), and at least one hyperlink to a multi-dimensional game resident on and executable from a digital medium accessible to a game server connected to the network and a social graph information reader resident on and executable from a digital medium accessible to the game server, the social graph information reader for identifying one or more players of the game by correlating identification information provided or known about the players with social graph data aggregated about the players, the data stored in and read from an accessible repository; and a game configuration interface resident on and executable from the digital medium accessible to the game server, the game configuration interface enabling a member to configure rules pertaining to game and or game object recognition of, and treatment of certain players of the game determined to be friends of the member.

In one embodiment, the network is the Internet network. In one embodiment, the game includes two and or three-dimensional game elements. In a preferred embodiment, execution of the social graph information reader is automatic and triggered by presence of a player entering the game. In one embodiment, the game player is recognized by the social graph connection type to the user. In one embodiment, the recognized game player is greeted by an existing handle or user name once recognized. In one embodiment, the user accesses social graph information by entering a URL to the social graph API.

In one embodiment, the multi-dimensional game is a gambling game. In one embodiment, the social graph information is automatically aggregated through system interaction with the API based on user-submitted information or information about the user that is known to the system. In one embodiment, the social graph API executes on behalf of a member each time the member logs into the gaming Website, subsequent executions for the purposes of updating the social graph information for that user.

According to another aspect of the present invention, in a network-based gaming system, a method is provided for discovering and engaging friends of members of the gaming system including the steps (a) using a social graph application program interface (API), aggregating the social graph of the member based on input known about or provided by the member, (b) presenting social graph data, including identification of social graph nodes to the member, (c) providing special incentives to and or treatments of social graph nodes that accept invitations to visit the site and or play a game, (d) sending invitations to social graph nodes of step (b), to join the site or to play a game, and (e) using a social graph information reader, recognizing social graph nodes who have accepted invitation and applying one or more special rules or treatments according to member submitted configurations.

In one aspect of the method, the network is the Internet network. In one aspect in step (a), the social graph API is installed on a Website and is run on behalf of members do discover their social graphs comprising their online relationships across the Web. In one aspect of the method in steps (b) through (e), the social graph nodes are persons.

In one aspect, in step (c), treatments include how a game and or game elements will respond or react to a specific social graph node identified as part of the social graph of a member. In one aspect, in step (d), invitations are sent via email, instant message (IM), short message services (SMS), or multimedia message service (MMS).

In one aspect of the method, in step (e), the social graph reader is invoked after the social graph node provides some piece of identification such as an email address or universal resource locator to a Web page owned by that user, the piece of identification used to identify the social graph node through correlation with social graph information previously obtained about that user. In another aspect, the gaming system includes access to one or more gambling games. In one aspect, the social graph nodes are recognized by the social graph connection type to the user. In one aspect in step (e), a social graph reader extension is provided for internal game elements to link to the social graph information reader.

BRIEF DESCRIPTION OF THE DRAWING FIGURES

DETAILED DESCRIPTION

The inventors provide a unique gaming system that enables social graph data aggregation on behalf of gaming site members so that friends, family, and other contacts of members may be intelligently engaged to help drive up membership for the site, for example. The present invention is described below in enabling detail using the following examples, which may describe more than one relevant embodiment falling within the scope of the present invention.

Figure 1:
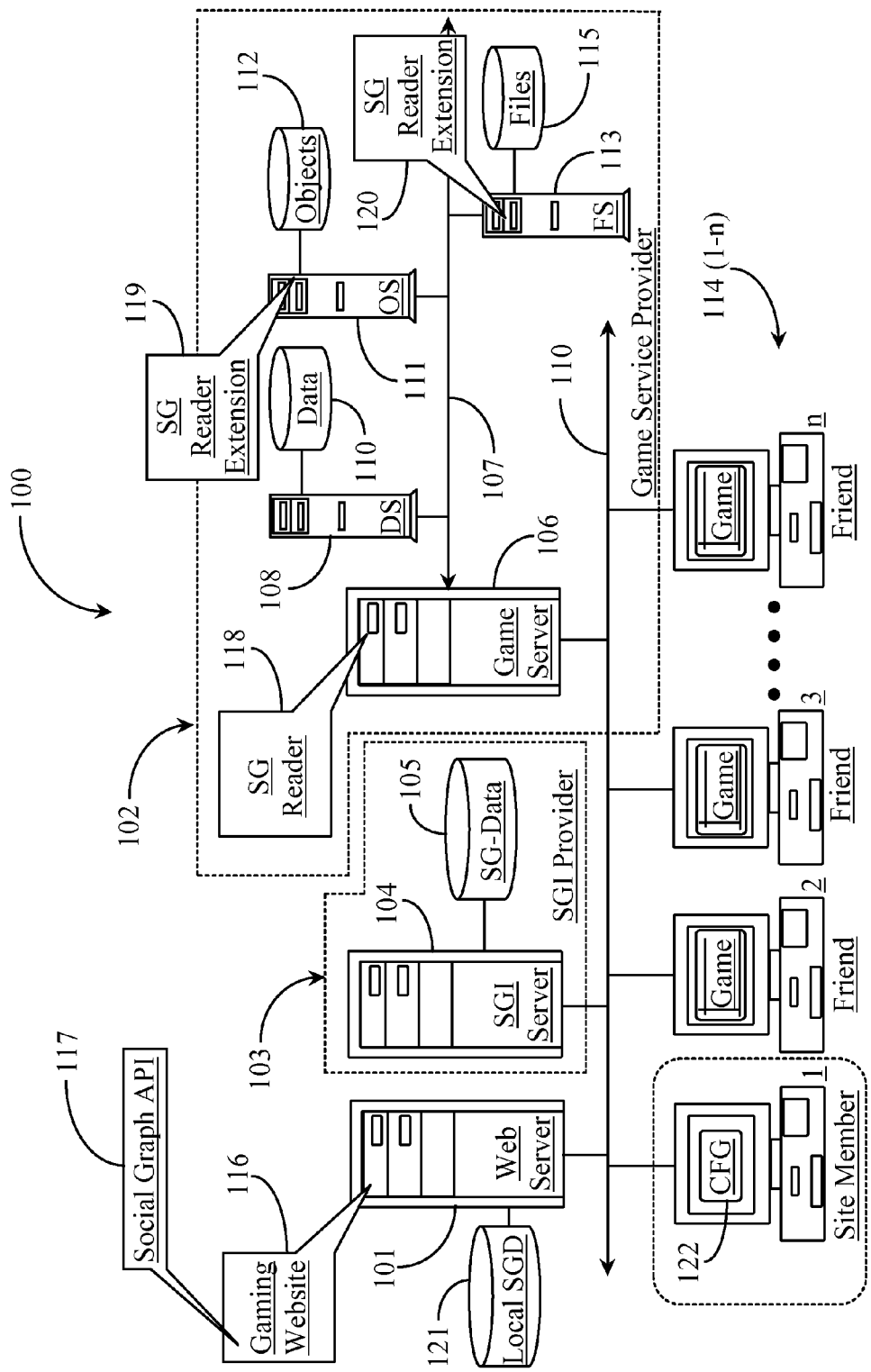
FIG. 1 is an architectural overview of a gaming network supporting social graph contact discovery and engagement according to an embodiment of the present invention.

FIG. 1 is an architectural overview of a gaming network 100 supporting social graph contact discovery and engagement according to an embodiment of the present invention. Network 100 includes an Internet network represented herein by a network backbone 110. Network backbone 110 represents all of the lines, equipment, and access points that make up the Internet network as a whole. Therefore, there are no geographic limitations to the practice of the present invention.

Internet backbone 110 supports a web server 101. Web server 101 includes a digital medium installed internally or otherwise accessible thereto that contains all of the data and software required to provide the function of web server. Web server 101 hosts websites for entities such as gaming website 116. Website 116 is a member website for those interested in online gaming. One good example of such as website would be that providing a gateway to play online two-dimensional and three-dimensional games. Although not illustrated here, a website like website 116 may be assumed to include at minimum, a login interface for affecting member sign-in, and at least one social club or group that collaborates to play and to build online games and game elements that might be incorporated in existing or new games. Website 116, also referred to herein as a gaming site, also includes universal resource locator (URL) links to online games that are served via a game server as will be detailed further in this specification.

In a preferred embodiment of the present invention, gaming website 116 has a social graph application program interface (API) 117 installed therein and adapted to provide social graph information about existing gaming site members through, in this case, a third-party social graph information aggregation service. A social graph information provider 103 is illustrated in this embodiment and is adapted to aggregate, sort, and provide social graph information for display and local storage. Social graph API 117 may run once completely for each new member of the site and then periodically afterward for purposes of updating the information over time. Web server 101 has connection to a data repository 121 labeled local social graph data. Local social graph data (SGD) represents a local repository available on the network to store aggregated social graph information for local use as in identification of friends on the server. Social graph information may also be held in a repository 105 labeled SG-Data. In fact it may well reside there and then be transported to repository 121 through server-to-server communication.

Social graph information (SGI) provider 103 includes a social graph information (SGI) server 104. Server 104 may also be involved in aggregating the social graph information across the Internet. In any event, the service is run upon request for an individual by entering a query such as a URL to one of the member's social interaction pages into the social graph API 117 installed on gaming website 116. SGI server 104 includes a digital medium installed internally or otherwise accessible thereto that contains all of the data and software required to provide the function of server of social graph information to requesting parties. SGI server 104 has connection to data repository 105 adapted to hold aggregated social graph data (SG-Data) for eventual service as mentioned above. Social graph data for a member includes all of that member's contacts, friends, and associates across the entire public Internet. The term public used here refers to the fact that social graph data is public data and therefore no permission is required to access the data. Connections to or from such social graph nodes include web addresses of websites or blog sites, profile pages, or others that are tagged in a format under a spec. XHTML Friends Network (XFN), Friend of a Friend (FOAF) or Google Open Social formats are available and many sites markup the social graph segments of those sites. Indication of the type of connection may be parsed from the web address string or by any other method employed by a third-party provider of social graph data.

Network 100 includes a game service provider 102. Game service provider 102 is an entity that specializes in providing the high-powered computing power and physics simulation of games and game objects interacted with in a game. In many gaming systems the "game server" is hosted by a third-party entity. In this example, provider 102 includes a game server 106. Game server 106 includes a digital medium installed internally or otherwise accessible thereto that contains all of the data and software required to provide the function of game server. In this regard, there may be other dedicated server that are ported to game server 106 for the purpose of providing specific components or game elements in real time as they are required. Game server 106 has a high-speed data link to a file server (FS) 113, an object server (OS) 111, and a data server (DS) 108. All three mentioned dedicated servers include a digital medium installed internally or otherwise accessible thereto that contains all of the data and software required to provide the stated functions of those servers.

Data server 108 has connection to an external data repository 110 adapted to host game data. Object server 111 has connection to a data repository adapted to host game objects and elements. File server 113 has connection to a data repository 115 adapted to host game files. Game service provider 102 provides high-powered game computing, physic simulation, (simulator not illustrated) and other game related data. In one embodiment of the present invention, game server 106 includes a social graph reader 118. Social graph reader 118 is adapted to read social graph data from any network-connected data repository containing social graph information. Using reader 118, gaming server 106 can ascertain if an individual, having connected to the server, is a friend, contact, or otherwise an associate of a gaming site member. A user may simply type in an email or other identification information such as a web address to a profile page, to be recognized at the game server using reader 118.

In one embodiment, access to reader 118 is provided to object server 111 in the form of an SG reader extension 119, and to file server 113 in the form of a SG reader extension 120. In this way, both the dedicated object server and the dedicated game file server may discover any special pre-configured rules associated with game play and object actions and reactions that might be established relative to one or more friends, family members, or other contacts of a site member as discovered through social graph data aggregation.

Internet backbone 110 supports, logically in this example, multiple Internet users 114 (1-n). Users 114 (1-n) are illustrated as personal computers in this example, but may actually be other computing appliances such as Laptop computers, 3G and 4G Smart Phones, an Android, I-Pad, or some other personal digital assistant (PDA). Actual connection to the Internet might vary between users 114 (1-n), for example suitable connections may include cable/modem, wireless broadband, Wireless Fidelity (WiFi), or other carrier networks or Internet Service Providers (ISP's). Of Internet users 114 (1-n), 114 (1) is actually a site member of gaming website 116 hosted by web server 101. Also in this embodiment, users 114 (2-n) are friends of the gaming site member. As such, the term "friends" used here generally, describes friends, family or other contacts discovered on behalf of the member leveraging social graph API 117 running on the gaming site. The current state of connection of the friends of site member 114 (1) is random and may result from an initial proactive invitation from the gaming system.

In one embodiment, a gaming site member such as member 114 (1), may access a game configuration (CFG) interface 122 in a process unrelated to friends discovery at the site. This configuration process may be to establish some incentives, benefits, play rules, object rules, or game file rules for any one of the members "friends" that happen to connect to the main website 116 and subsequently to any games hosted on game server 106. Therefore, friends of the member may be "discovered" by asking them for a simple and public piece of information like an email address, or a web address (URL) to a public profile page. Once discovered, any special and permitted rules, rule modifications, incentives, game object actions and or reactions may be applied to the interaction of that friend with the gaming system.

In this example, all of the illustrated friends 114 (2-n) of the site member 114 (1) are connected to game server 106 on the Internet and are each playing a game hosted by the server. None of the "friends" of the site member were required to login to the website or to the game server. In one embodiment the friends 114 (2-n) are recognized by submitting a public identity such as an email, chat handle, or a web address to a public profile. This data may be submitted to SG reader 118 running on server 106. SG reader 118 is adapted to perform a lookup in a database containing social graph information such as local social graph data (SGD) in repository 121 connected to Web server 101. The SG reader can then determine if the discovered user is a friend of a member of the gaming site. In one embodiment this determination may be first made at web server 101 from gaming site 116 using the social graph API interface manually.

A site member may, according to website permissions, provide certain amenities to his or her friends that are connected to them across the Internet. An amenity might be free currency for my friends for use at the gaming site. Another amenity might be free bonus rounds for all my friends when playing certain games accessible through the website. In one embodiment, the system might discover member's friends and may offer certain amenities to those friends through the member in member-created invitation messages. If the member does well and is in good standing, friends of the member might receive special treatment by the system providing some incentive for the friends of the member to visit, play, and perhaps ultimately become site members.

In one unique aspect of the invention, game elements such as two or three-dimensional objects and files may have a tag or extension to social graph (SG) reader 118 such as SG reader extension 119 running on object sever 111 and SG reader extension 120 running on file server 113. This capability distribution to servers at a more atomic level enables a game object or game element like a game file to recognize the player that has invoked the game object, element, or file before it is served and is put into service.

Practicing the invention at the granularity of sub servers of gaming server 106 is absolutely not required in order to practice the invention. It may however offer convenience that an object may change certain attributes based on who is invoking the object. For example, suppose a car in a game comes with an empty fuel tank for normal players of the game leaving those players to uncover or earn a cache of fuel before they could start and drive the car. In one example the object car may recognize the player that invoked it as a "friend" of certain member #12365 and has a player-configured attribute as arriving full of fuel for that player. API calls for recognition of a user include IsFriend( ), IsBestFriend( ), IsBuddy( ), IsEnemy( ). The social graph aspect includes API calls such as MakeFriend( ), IsInGroup( ), JoinGroup( ), and ExitGroup( ), that enable addition of new friends by adding friends and by joining groups, including exiting groups.

In one embodiment, a player that is a friend of a member #12365 as cited above is recognized when logged into gaming website 116 using the social graph API 117. When the player selects a game to play on the website the identification of the player as a "friend" of member #12365 is tagged to the player and communicated to the game server and sub servers so the player is known to the entire system.

In one embodiment, distribution of SG reader extensions 119 and 120 enables a "friend" of a member bypass the gaming website and log directly into game server 106 to play new games or to resume a game in progress. In this regard, SG reader 118 running on game server is leveraged to identify the player from a prompt for an email address or some other public identity that is found in the SG data. The player can be recognized at the website and at the game server. Social graph aggregation and presentation of a member's social graph enables the member to quickly involve any of his or her friends, family, and contacts with the gaming site. The gaming system of the invention provides for automated recognition of friends, family, or associates of members when those persons visit the gaming site. Such identification enables real time configuration of gaming properties allowed by the system for certain players who are "connected" to a site member.

Figure 2:
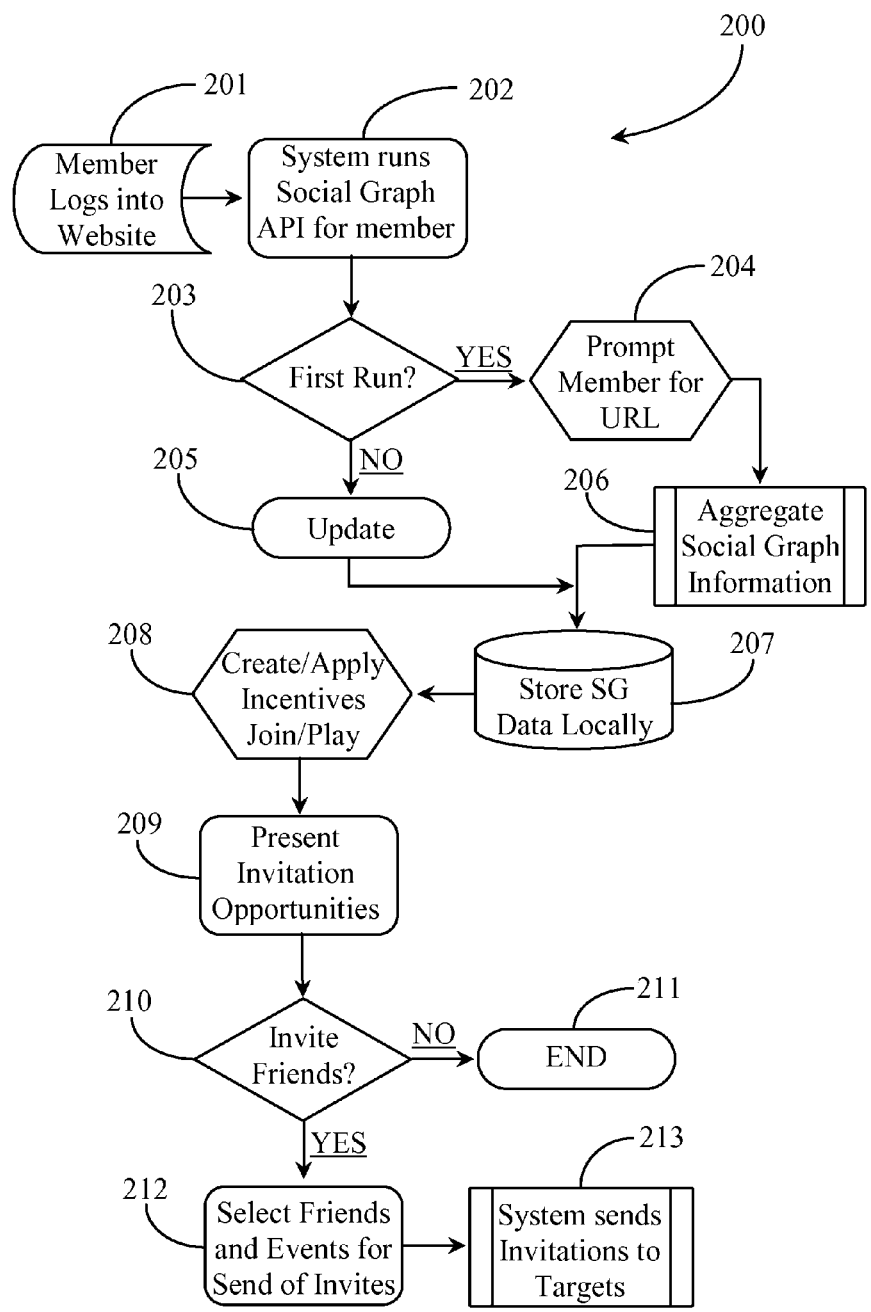
FIG. 2 is a process flow chart illustrating steps for aggregating social graph information of a gaming site member.

FIG. 2 is a process flow chart 200 illustrating steps for aggregating social graph information of a gaming site member. At step 201, a gaming site member logs into the website. At step 202, the system automatically invokes the social graph API for the member. At step 203, the system determines if the member has been run before at the current site. If so, then at step 205 the social graph API simply does an update to information already compiled. Social graph data may change in real time as connections evolve and are terminated or released by a member as a result of management of the social contacts across the member's web services. An update to existing data would add new connections and, perhaps purge old or invalid connections. In case of a first run at step 203, the member might be asked to provide some web address to a public profile at step 204 to use as a basis for aggregation of the members existing "connections" across the Internet. At step 206, the social graph API aggregates the social graph information and stores the information locally in a repository at step 207. The information provider may be a third-party application of which more than one is known currently for crawling the Web and aggregating the social graph information for all users.

Once a list of connections for a site member has been developed, the member and or the system may create and apply incentives, offers, etc at step 208 for communication to those connections referred to herein as social graph nodes, which are humans. At step 209, the system or the member may present invitation opportunities to some or all of his or her connections identified as part of the social graph of the member. The member's social graph connections may include Myspace™ contacts, Facebook™ contacts, Digg™ contacts, Linkedin™ contacts, and any other publicly stated contacts connected to the user in any way. In one embodiment of the present invention, publicly stated fans, readers, and followers of a member may be "discovered" and intelligently engaged automatically as a "friend" to the member.

At step 210 the system or member decides whether to invite any friends discovered through the social graph aggregation process. If the determination is no at step 310 then the process ends for that member. If at step 210, the member or system determines to invite friends, then at step 212 the targets and events are selected for invitation messaging. Friends may be invited to play certain games with bonus bucks, and other gaming incentives. Individual invitees belonging to the social graph of one member may be treated differently than other invitees having no social connection to the service. There may be other reasons to treat connections differently within social graph nodes belonging to the social graph of a member. The granularity may be down to one individual as to who is actually invited to play games or to socialize at the website, such as in a builders club social interaction group, for example.

Figure 3:
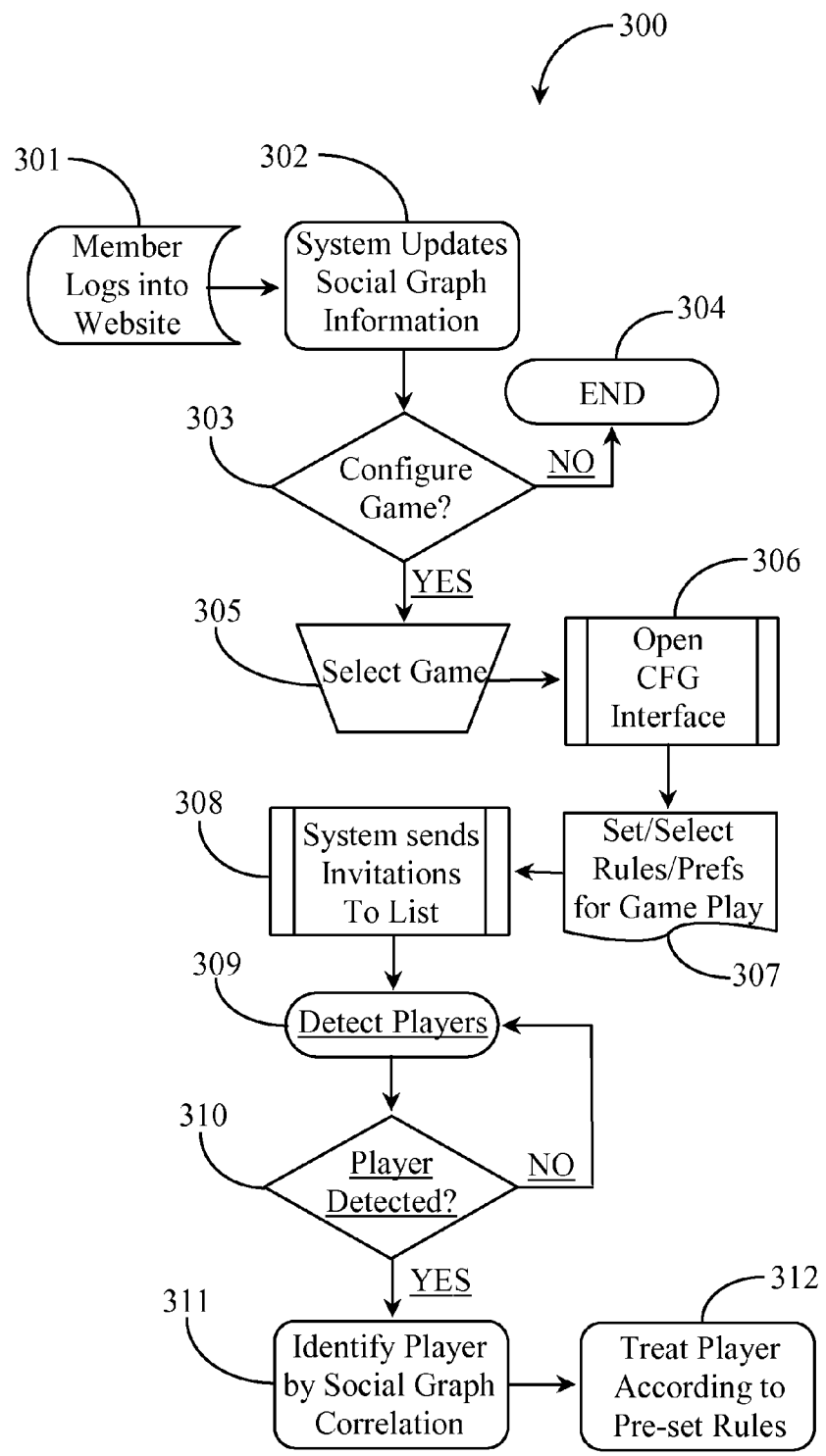
FIG. 3 is a process flow chart illustrating steps for pre-configuring a game for special treatment of friends who accept play invitations from the system.

FIG. 3 is a process flow chart 300 illustrating steps for pre-configuring a game for special treatment of friends who accept play invitations from the system. At step 301, a member logs into the gaming website. In one embodiment, the system automatically updates the latest social graph information for that member at step 302. This process assumes the member has had his graph previously aggregated. In this aspect, the game site member has the opportunity to reconfigure a game for special treatment of one or more friends that might be invited to play the game at some later point in time. At step 303 the member decides whether to configure a game for friends. If at step 303 the determination is no, then at step 304 the process ends for that game. At step 303, the member decides to configure a game to recognize friends and to treat them according to a configuration script, which may be accessed as a game configuration interface.

There may be a game configuration interface for each existing game. If at step 303 the member decides not to configure any game then the process for that member may end at step 304. If the member intends to configure a game then the process moves to step 305 wherein the member may then select a particular game for configuration. At step 306 the member opens the configuration interface associated with the game if it is not already opened for the member. At step 307 the configuring members sets or selects rules, preferences, etc. for game play relative to friends of the sight member who may connect to play that game at some later point.

Players who accepted invitations at step 308 begin showing at step 309. At step 309 the system attempts to detect players that responded to invitations. At step 310 the system determines if a player is detected. If not then the step resolves back to step 309 as an ongoing monitoring or listening step. If a player is detected by the system at step 310, the system attempts to discover the identity of the player by correlating with the social graph data aggregated locally such as at the gaming Website.

Using an SG-data reader like reader 118 described in FIG. 1, the system attempts to identify the player at step 311. In this step the reader looks up in the social graph data and matches an identification key such as a public email, or a public URL to those that are stored in the data relative to discovered friends. This step may occur in real time as a player begins to enter or has entered a game new game or a game in progress. At step 312 the system "game" treats the player according to the pre-set parameters provided earlier by the member.

These type pf games may be member built games in one embodiment that the member tailors for play with select friends. The game might be a form of gambling game where the member is inviting others in his social graph to face off against a team of system-generated thugs or even social graph nodes invited by an opposing member, thereby raising a team on both sides of the game, the members allowed to write the rules and scripts only for their own friends in play. Therefore, two game site members could conspire to create a game that they then may use to bring in their friends, family and associates to form teams against an opposing team of contacts belonging to the social graph of another member. Each of these players may also have an opportunity to become members of the website. In one embodiment a member's social graph may include another member and there may then be common nodes in the social graphs of both members. A player having connection to both game builders may be allowed to choose which side he or she will play on.

Figure 4:
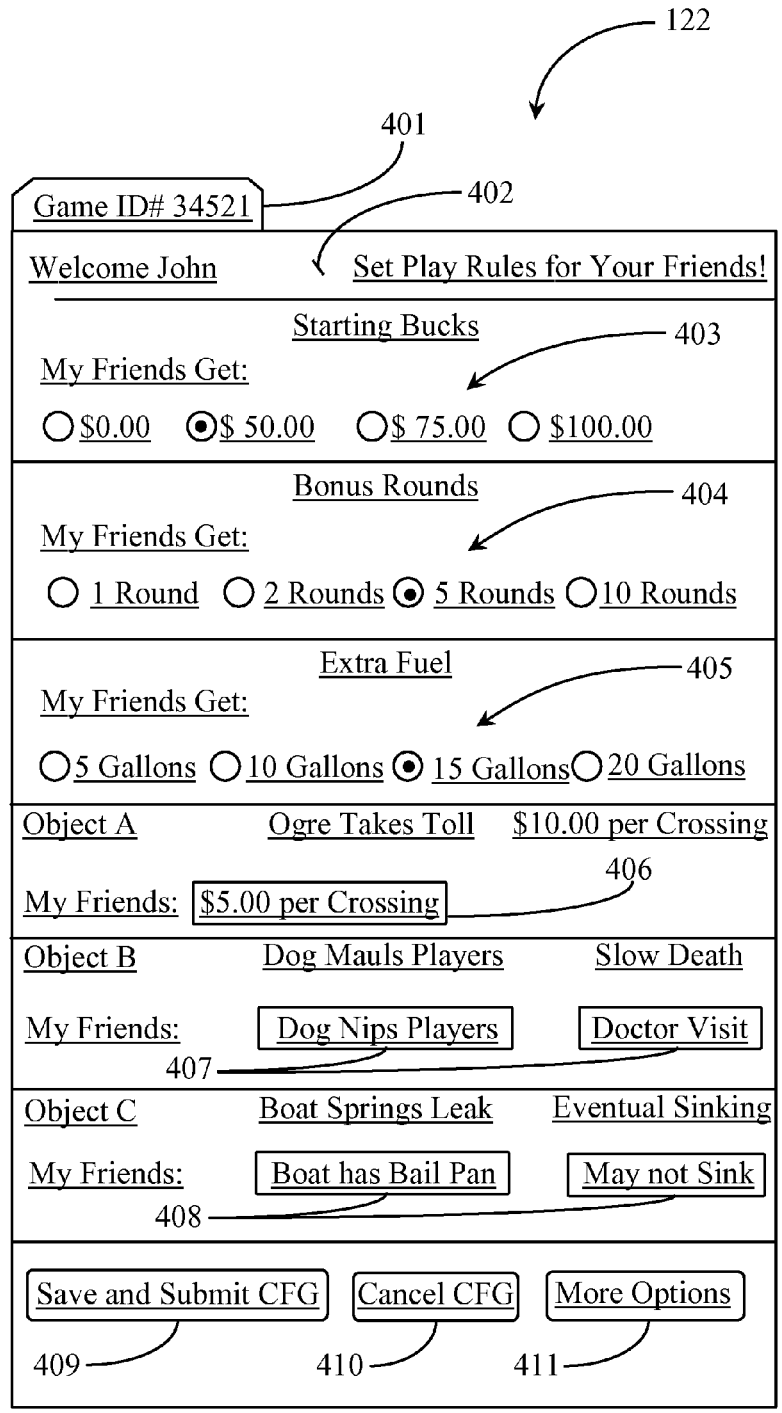
FIG. 4 is a screen shot of the game configuration interface of FIG. 1 for configuring special rules of game play for detected friends of a site member.

FIG. 4 is a screen shot of game configuration interface 122 of FIG. 1 for configuring special rules of game play for detected friends of a site member. Screen shot 122 is exemplary of an electronic configuration interface for configuring a game for play at a latter time. Interface 122 includes a title bar 401 labeled Game ID #34521. John is the site member and is welcomed in welcome bar 402.

Configuration Option 403 labeled Starting Bucks allows the member to pick from four allowable amounts ranging from $0.00 up to $100.00 with $50.00 selected by the member. Configuration option 404 labeled Bonus Rounds allows the member to pick from four amounts of bonus rounds ranging from 1 bonus round to 10 rounds. A Configuration option 405, labeled extra fuel, allows the member to pick from four allowable amounts of extra fuel ranging from 5 gallons of fuels to 20 gallons of fuel.

A configuration option for an Object A labeled "Ogre Takes Toll" refers to a configuration option the controls a game object attribute for an Ogre that a player must confront to pay a toll to get across a bridge in the game. The normal crossing charge is $10.00. The charge typed into block 406 or appearing there as a result of member selection from a drop down list of attributes to friends of the member is only $5.00. A configuration option for Object B labeled "Dog Mauls Players" shows the normal result of "Slow Death" for the player. The member has typed selected from a list of rules that the "Dog Nips Players" resulting in a "Doctors Visit".

A configuration option for an Object C labeled "Boat Springs Leak" refers to a leaky boat in the game that a player could take across the river but risks sinking before making it to the other side. The member has typed into boxes 408 or it has appeared from the member selecting an attribute from a provided list accessible through menu that the "Boat has a Bail Pan" and the possible result "May Not Sink". Interface 122 may be an entirely different form or variety of game configuring interface that is seen here without departing from the spirit and scope of the present invention. This interface results in identifying game treatments for all of the member's friends who play it. However, in another embodiment there may be friends with certain weapons or skills that you cannot match to all of your friends therefore being reconciled to configure more than one set of friends or more than one individual contact.

Figure 5:
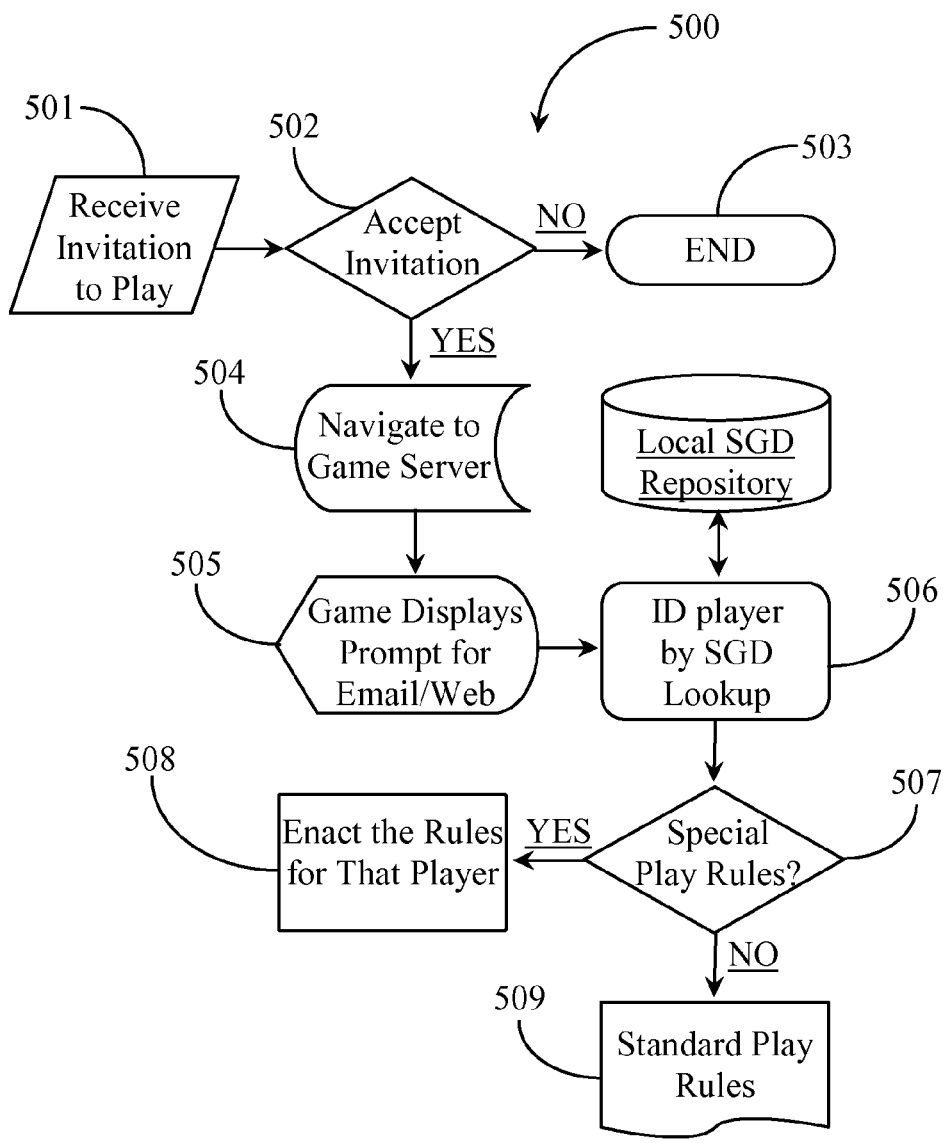
FIG. 5 is a process flow chart illustrating steps for treating a detected friend of a site member during game play.

FIG. 5 is a process flow chart 500 illustrating steps for treating a detected friend of a site member during game play. At step 500 a friend of a member receives an invitation to play. The invitation may be an email, a short message service (SMS), a multimedia message service (MMS), an Instant Message (IM), or other type of message. At step 502, the player that received the invitation of step 501 determines whether to accept the invitation at step 502. If the player does not accept, the process resolves to end step 503 for that player.

If at step 504 the player has accepted the invitation, then the player may be automatically directed to the game server at step 504 if the game is live or ongoing. Otherwise the player may navigate to the game server when the game is scheduled to begin play. At step 505 the game displays for the player and may prompt the player for an email address, URL to a public profile page of that player or some other public form of ID that could be used to identify that player with reference to a member's social graph. At step 506 the system identifies the player using a database lookup and match.

Once the player is identified, the system determines if there are any special play rules that will affect the player at step 507. If it is determined that there are no new or different rules for the player, the process resolves to step 509 where standard play rules will apply. If it was determined that there are special rules for game play at step 507, then at step 508 the system may enact the rules of play for that member. Such enactment may be immediate in a real time gaming environment. Some games are ongoing types of games where users drop in to play and may drop out when finished. Some games are new and must be started when all players arrive or by a moderator when enough players are present to play the game.

It is noted herein that intelligent game objects may be programmed to use social graph information as part of an API for persons writing code against those objects. The social graph information is utilized as an extension to the API, and refers to all users in the gaming system and not only those players in a game. The intelligent objects in the game can react to environmental events and may execute code when enabled. These objects may be created by gamers or by game creators.

It will be apparent to one with skill in the art that the gaming system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. An Internet based gaming system comprising:

a website resident on and executable from a digital medium accessible to a web server connected to the Internet, the website including a member login interface, a social graph application program interface (API), and at least one hyperlink to games resident on and executable from a digital medium accessible to a game server connected to the Internet, the games each comprising a first set of rules and incentives applicable to players and to the player's actions and reactions with objects of the game; and a social graph information reader having a social graph specific to a member of the gaming system, resident on and executable from a digital medium accessible to the game server, the social graph information reader identifying one or more associates of the member by accessing the graph and correlating identification information provided or known about the associates, the data stored in and read from an accessible repository;

wherein upon initial member login at the website the social graph is created via detection of member interaction by the social graph API from any connection type across the Internet accessed by the member, and associates are discovered and added to the social graph by a social graph connection type to the member, the associates not current members of the gaming system, and wherein the member utilizes a game configuration interface resident on and executable from the digital medium accessible to the game server, the game configuration interface enabling the member to configure a second set of rules and incentives applicable to the players and to the players actions and reactions with objects of the game, for individual ones of the games, and upon one or more of the selected associates entering the game, the social graph information reader recognizes the associates and applies the second set of rules and incentives applicable to the players and to the player's actions and reactions with objects of the game configured by the member for the individual game.

2. The gaming system of claim 1, wherein the incentives offered in the game includes two or three dimensional game elements.

3. The gaming system of claim 1, wherein the execution of the social graph information reader is automatic and triggered by the act of the associate entering the game.

4. The gaming system of claim 1, wherein the recognized associate is greeted by an existing handle or user name once recognized.

5. The gaming system of claim 1, wherein the member accesses social graph information by entering a URL to the social graph API.

6. The gaming system of claim 1, wherein the multi-dimensional game is a gambling game.

7. The gaming system of claim 1, wherein the social graph information is automatically aggregated through system interaction with the API based on member-submitted information or information about the member that is known to the system.

8. The gaming system of claim 1, wherein the social graph API executes on behalf of the member each time the member logs into the gaming Website, subsequent executions for the purposes of updating the social graph information for that user.

* * * * *